United States Patent
Ong et al.

(10) Patent No.: US 11,681,946 B2
(45) Date of Patent: Jun. 20, 2023

(54) AUTOMATED REGRESSION DETECTION SYSTEM FOR ROBUST ENTERPRISE MACHINE LEARNING APPLICATIONS

(71) Applicant: SAP SE, Walldorf (DE)

(72) Inventors: Marcia Ong, Singapore (SG); Denny Jee King Gee, Singapore (SG)

(73) Assignee: SAP SE, Walldorf (DE)

( * ) Notice: Subject to any disclaimer, the term of this patent is extended or adjusted under 35 U.S.C. 154(b) by 413 days.

(21) Appl. No.: 16/408,609

(22) Filed: May 10, 2019

(65) Prior Publication Data
US 2020/0356895 A1   Nov. 12, 2020

(51) Int. Cl.
*G06N 20/00*   (2019.01)

(52) U.S. Cl.
CPC .................... *G06N 20/00* (2019.01)

(58) Field of Classification Search
CPC ...................................... G06N 20/00
See application file for complete search history.

(56) References Cited

PUBLICATIONS

Coelho, R. et al, Unit Testing in Multi-agent Systems using Mock Agents and Aspects [online]. 2006 [Retrieved Jun. 28, 2021]. Retreived from Internet:<https://dl.acm.org/doi/pdf/10.1145/1138063.1138079> (Year: 2006).*

Nguyen, T. et al, Automated Detection of Performance Regressions Using Statistical Process Control Techniques [online]. 2012 [ Retrieved Jun. 28, 2021]. Retrieved from Internet:<https://dl.acm.org/doi/pdf/10.1145/2188286.2188344> (Year: 2012).*

Jimenez, I. et al, quiho: Automated Performance Regression Testing Using Inferred Resource Utilization Profiles [online] 2018 [Retrieved Jun. 28, 2021]. Retrieved from Internet:<https://dl.acm.org/doi/pdf/10.1145/3184407.3184422> (Year: 2018).*

Pei, K. et al DeepXplore: Automated Whitebox Testing of Deep Learning Systems [online], 2017 [retrieved Jun. 28, 2021]. Retrieved from Internet:<https://dl.acm.org/doi/pdf/10.1145/3132747.3132785> (Year: 2017).*

Jin, W. et al, Automated Behavioral Regression Testing [online], 2010 [Retrieved Jun. 28, 2021]. Retrieved from Internet:<https://ieeexplore.ieee.org/stamp/stamp.jsp?tp=&arnumber=5477091> (Year: 2010).*

Bhattacharjee, B. et al, IBM Deep Learning System [online], [Retrieved Jan. 10, 2022]. Retrieved from Internet:<https://ieeexplore.ieee.org/abstract/document/8030274> (Year: 2017).*

(Continued)

*Primary Examiner* — Miranda M Huang
*Assistant Examiner* — Bart I Rylander
(74) *Attorney, Agent, or Firm* — Fish & Richardson P.C.

(57) ABSTRACT

Methods, systems, and computer-readable storage media for determining, by an automated regression detection system (ARDS), that training of a ML model is complete, the ML model being a version of a previously trained ML model, and in response, automatically, by the ARDS: retrieving the ML model, executing regression testing and detection using the ML model, generating regression results relative to the previously trained ML model, and publishing the regression results.

20 Claims, 5 Drawing Sheets

(56) References Cited

PUBLICATIONS

Nguyen, T. et al, Automated Detection of Performance Regressions Using Statistical Process Control Techniques [online]. 2012 [Retrieved Jun. 28, 2021]. Retrieved from Internet:<httpos://dl.acm.org/doi/pdf/10.1145/2188286.2188344> (Year: 2 012).*

Pei, K. et al DeepXplore: Automated Whitebox Testing of Deep Learning Systems [online], 2017 [retrieved Jun. 28, 2021]. Retrieved from Internet:<https://dl.acm.org/doi/pdf/10.1145/3132747.3132785> (Year: 2018).*

Foo, K., Mining Performance Regression Testing Repositories for Automated Performance Analysis, [retrieved Nov. 28, 2022]. Retrieved from Internet:<https://ieeexplore.ieee.org/abstract/document/5562942/> (Year: 2010).*

U.S. Appl. No. 17/008,808, Juay et al., "Automated Regression Detection Framework for Supporting Robust Version Changes of Machine Learning Applications" filed Sep. 1, 2020, 34 pages.

U.S. Appl. No. 16/217,148, Saito et al., "Utilizing Embeddings for Efficient Matching of Entities," filed Dec. 12, 2018, 29 pages.

* cited by examiner

| Version | Type/Time | Key | Company | PR(S) | Acc(S) | AR(S) | PR(S+M) | Acc(S+M) | AR(S+M) | Training Time |
|---|---|---|---|---|---|---|---|---|---|---|
| release-v7.7 | Base (2019-06-25, 10:30) | SG | ALL | 90.83 | 97.55 | 88.61 | 66.88 | 97.53 | 65.23 | |
| | | MY | ALL | 52.59 | 97.22 | 51.13 | 33.17 | 97.32 | 32.28 | |
| | | AU | ALL | 99.66 | 97.16 | 96.82 | 86.98 | 97.05 | 84.41 | 20h45m32s |
| | | US | ALL | 100.25 | 97.16 | 97.40 | 97.05 | 98.28 | 95.38 | |
| | | NZ | ALL | 98.95 | 97.88 | 96.85 | 78.44 | 97.19 | 76.23 | |
| | | ALL | ALL | 98.95 | 97.88 | 96.85 | 78.44 | 97.19 | 76.23 | |
| | Latest (2019-07-04, 15:16) | SG | ALL | 89.58 | 97.21 | 87.08 | 68.53 | 97.05 | 66.51 | |
| | | MY | ALL | 51.13 | 97.40 | 49.80 | 33.33 | 97.09 | 32.36 | |
| | | AU | ALL | 99.48 | 97.41 | 96.91 | 86.62 | 97.31 | 84.29 | 20h10m58s |
| | | US | ALL | 100.30 | 97.11 | 97.40 | 97.24 | 98.29 | 95.57 | |
| | | NZ | ALL | 98.43 | 97.60 | 96.06 | | 97.47 | | |
| | | ALL | ALL | 98.43 | 97.60 | 96.06 | | 97.47 | | |

*FIG. 3*

AUTOMATED REGRESSION DETECTION SYSTEM FOR ROBUST ENTERPRISE MACHINE LEARNING APPLICATIONS

BACKGROUND

In general, machine learning includes training a machine learning (ML) model that receives input and provides some output. For example, a ML model can be included in an enterprise application that can perform operations in furtherance of the enterprise and/or customers of the enterprise. Machine learning can be used in a variety of problem spaces. An example problem space includes matching items of one entity to items of another entity. Examples include, without limitation, matching questions to answers, people to products, and bank statements to invoices.

However, as enterprise applications evolve, new features may be introduced, and/or existing features may be removed or enhanced. For enterprise applications using ML models, it is the task of the ML developers to retrain ML models in view of changes and conduct tests on the retrained ML models to validate performance of the ML models. For example, a retrained ML model can result in regression in performance as compared to the previous trained ML model. Regression in performance can include that the retrained ML model is less accurate in its predictions than the previous ML model, and/or is otherwise less efficient in its execution (e.g., slower, more resource consumption).

SUMMARY

Implementations of the present disclosure are directed to regression testing of machine learning (ML) models. More particularly, implementations of the present disclosure are directed to automated testing and regression detection of ML models.

In some implementations, actions include determining, by an automated regression detection system (ARDS), that training of a ML model is complete, the ML model being a version of a previously trained ML model, and in response, automatically, by the ARDS: retrieving the ML model, executing regression testing and detection using the ML model, generating regression results relative to the previously trained ML model, and publishing the regression results. Other implementations of this aspect include corresponding systems, apparatus, and computer programs, configured to perform the actions of the methods, encoded on computer storage devices.

These and other implementations can each optionally include one or more of the following features: executing regression testing and detection using the ML model comprises determining variance in performance of the ML model using a Gaussian process (GP); the variance includes one or more of a negative-side variance indicating regression of the ML model relative to the previously trained ML model, and a positive-side variance indicating improvement of the ML model relative to the previously trained model; determining that training of a ML model is complete includes determining that a container within which the ML model is trained in a ML server is shutdown; publishing the regression results includes transmitting one or more notifications to respective stakeholders through a communication platform; publishing the regression results includes providing a user interface (UI) for display, the UI graphically depicting regression results as between the ML model and the previously trained ML model; and the regression results are based on a set of attributes that each represent a respective performance of the ML model relative to the previously trained ML model.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 3 depicts example regression testing results.

Like reference symbols in the various drawings indicate like elements.

DETAILED DESCRIPTION

Figure 1:
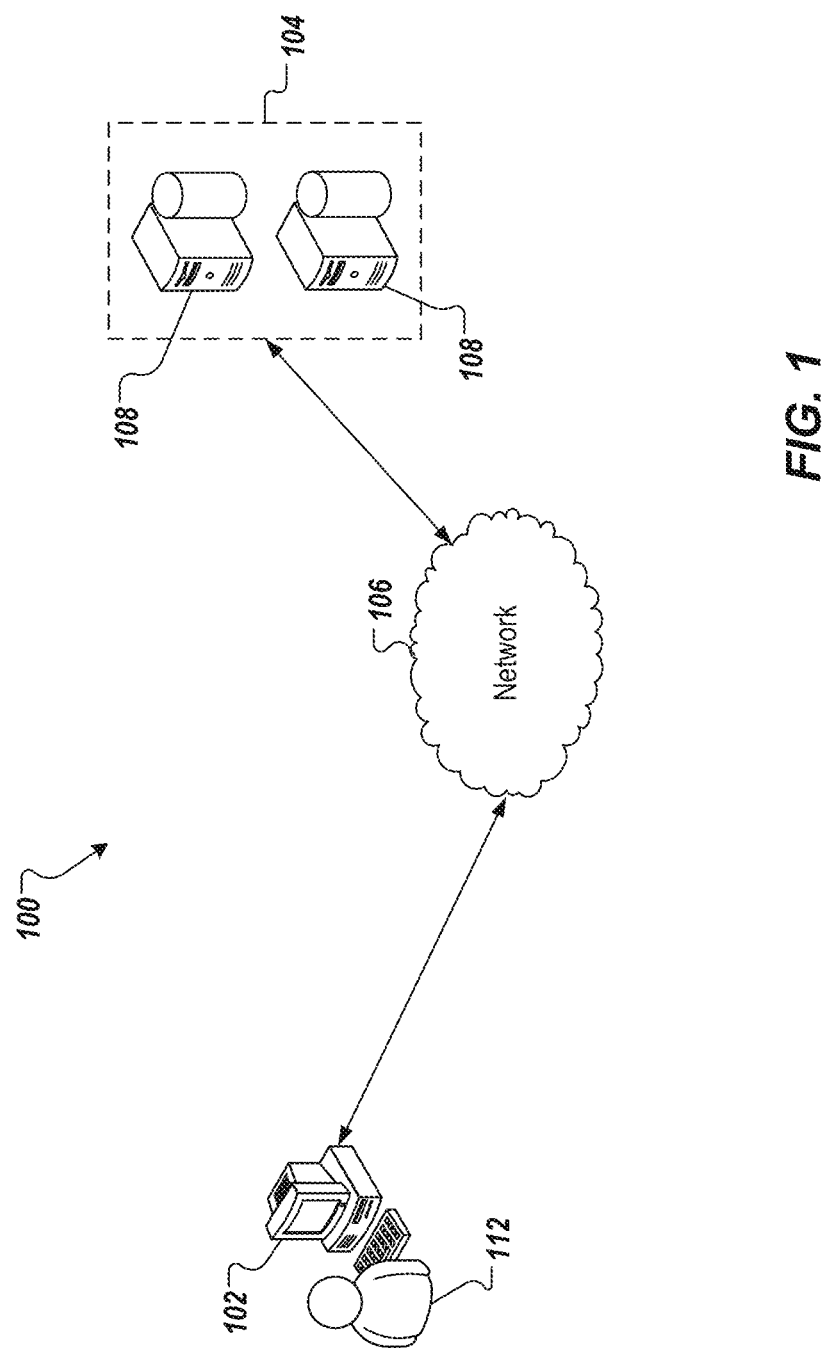
FIG. 1 depicts an example architecture that can be used to execute implementations of the present disclosure.

Implementations of the present disclosure are directed to regression testing of machine learning (ML) models. More particularly, implementations of the present disclosure are directed to automated testing and regression detection of ML models. Implementations can include actions of determining, by an automated regression detection system (ARDS), that training of a ML model is complete, the ML model being a version of a previously trained ML model, and in response, automatically, by the ARDS: retrieving the ML model, executing regression testing and detection using the ML model, generating regression results relative to the previously trained ML model, and publishing the regression results.

To provide further context for implementations of the present disclosure, and as introduced above, machine learning can be used in a variety of problem spaces. An example problem space includes matching items of one entity to items of another entity. Examples include, without limitation, matching questions to answers, people to products, and bank statements to invoices. For example, electronic documents representing respective entities can be provided as input to a ML model, which matches electronic documents. In some examples, the ML model can output a match between electronic documents with a confidence score representing an accuracy of the predicted match.

In the example domain of matching bank statements to invoices, ML models can be customized by a region (e.g., country) and are trained based on sets of training data that are specific to a respective region. This results in a scalability bottleneck for enterprise applications that leverage ML models, due to cross-validation of ML model performance against diverse sets of training data (e.g., region-specific training data). In some examples, ML models can change and need to be trained in view of the changes, and tests conducted on the (re)trained ML models to validate a performance of the ML models. For example, a ML model can result in regression in performance as compared to a previous version of the ML model. Regression in performance can include that the ML model is less accurate in its predictions than the previous ML model, and/or is otherwise less efficient in its execution (e.g., slower, more resource consumption).

In traditional systems, regression testing requires manual effort and technical resources expended from a ML development team to monitor the completion status of ML model training, conduct regression test analysis after training, and generate and provision regression tests to the stakeholders (e.g., product owner and customer success team). That is, traditional systems require technical resources and human resources (e.g., man-hours) to be allocated to each training job. This is not scalable in a production environment that may demand hundreds to thousands of training jobs per day, for example.

In view of the above context, implementations of the present disclosure provide a platform for automated regression detection in retrained ML models. More particularly, implementations of the present disclosure are directed to an automated regression detection system (ARDS) that monitors training of ML models, and automatically tests ML models after training to detect regression. In some examples, notifications can be issued to stakeholders in response to automatic regression detection.

Implementations of the present disclosure are described in further detail sometimes referencing to an example problem space that includes matching bank statements to invoices. More particularly, implementations of the present disclosure are described with periodic reference to the problem of, given a bank statement (e.g., a computer-readable electronic document recording data representative of the bank statement), determining an invoice (e.g., a computer-readable electronic document recording data representative of the invoice) that the bank statement matches to. In some examples, matching can include matching a single bank statement to a single invoice (one-to-one, or single matching (S)). In some examples, matching can include matching multiple banks statements to a single invoice, and/or matching a single bank statement to multiple invoices (many-to-one, many-to-many, or multiple matching (M)). It is contemplated that implementations of the present disclosure can be realized in any appropriate problem space.

In the example problem space, an example ML model is described in detail in commonly assigned U.S. application Ser. No. 16/217,148, filed on Dec. 12, 2018, and entitled Utilizing Embeddings for Efficient Matching of Entities, the disclosure of which is expressly incorporated herein by reference in its entirety for all purposes.

Implementations of the present disclosure are also described in further detail sometimes referencing an example enterprise application that leverages ML models. The example enterprise application includes the SAP Cash Application provided by SAP SE of Walldorf, Germany. The SAP Cash Application includes functionality for matching bank statements to invoices and leverage ML models to learn from manual accounting actions, capturing detail of customer- and country-specific behavior. In some examples, SAP Cash Application uses SAP S/4HANA, also provided by SAP SE, to pass incoming payment and open invoice information to a cloud-based matching engine, and proposed matches are generated, and either automatically cleared or suggested for review. It is contemplated, however, that implementations of the present disclosure can be realized with any appropriate enterprise application that leverages ML models.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an ARDS for automatic testing and detection of regression in trained ML models. That is, the server system 104 can receive trained ML models (e.g., from a ML model training server), can test the trained ML models using test data, and can detect regression based on results of the testing.

Figure 2:
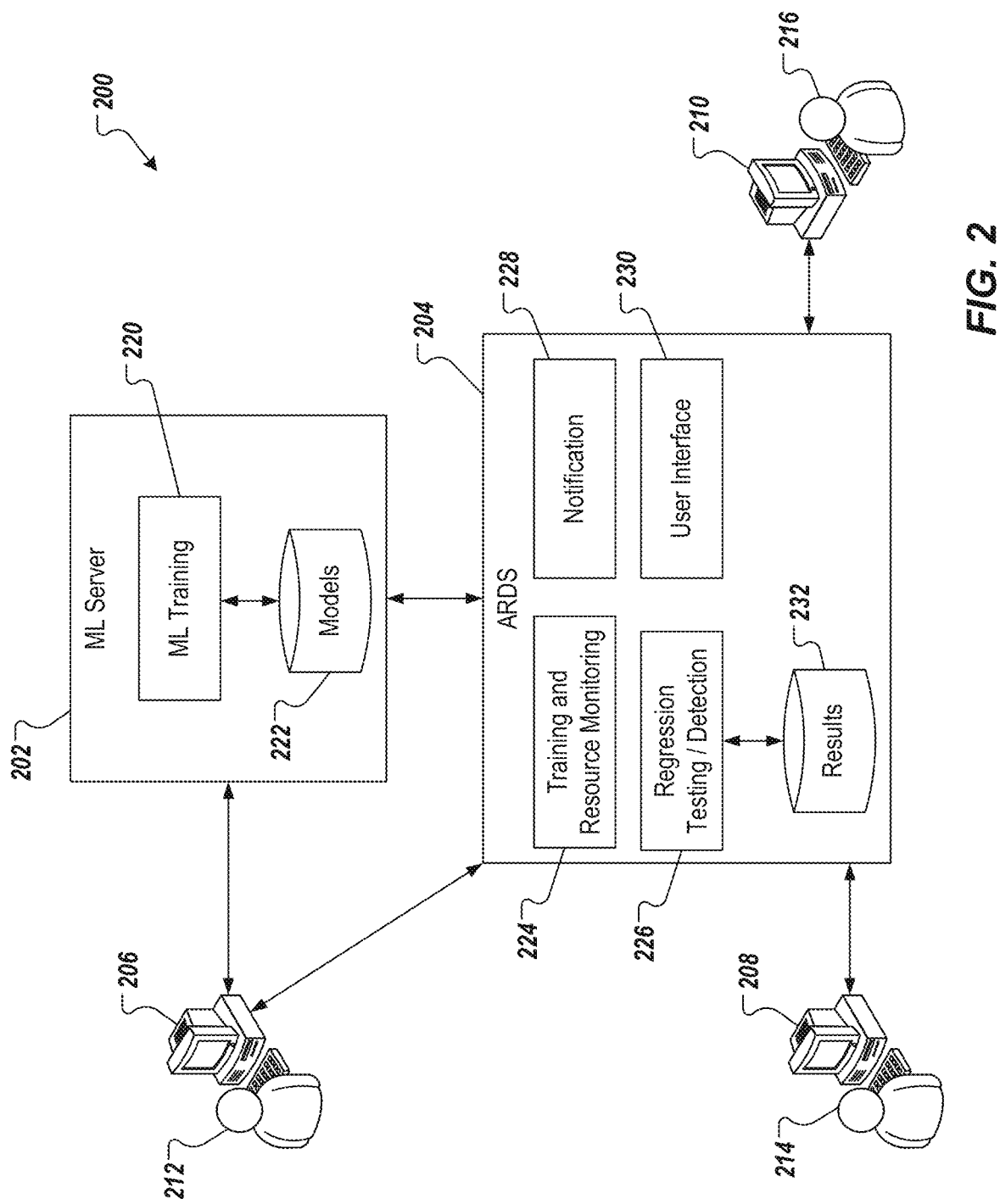
FIG. 2 depicts an example conceptual architecture in accordance with implementations of the present disclosure.

FIG. 2 depicts an example conceptual architecture 200 in accordance with implementations of the present disclosure. In the depicted example, the example conceptual architecture 200 includes a ML server 202 and an ARDS 204. In some examples, and as described in further detail herein, the ML server 202 trains ML models and the ARDS 204 monitors model training by the ML server 202. Upon completion of the training, the ARDS 204 receives a trained ML model and automatically conducts testing and detects regression, if any.

The example conceptual architecture 200 further includes computing devices 206, 208, 210 and respective users 212, 214, 216. In some examples, the users 212, 214, 216 represent stakeholders that are notified of performance of a trained ML model. For example, and as described in further detail herein, one or more of the users 212, 214, 216 can be notified of testing results of a trained ML model. For example, the ARDS 204 can issue notifications to the computing devices 206, 208, 210 for consumption by the users 212, 214, 216.

In the example of FIG. 2, the ML server includes a ML training module 220 and a model repository 222. In some implementations, the ML training module 220 performs training of ML models. In general, training of a ML model includes supervised training, unsupervised training, or semi-supervised training. Training of the ML model is performed over multiple iterations with each iteration providing an error value that represents an accuracy of the ML model in providing output based on input. When the error is determined to be sufficiently low (e.g., below a threshold error) training of the ML model can be determined to be complete.

In some implementations, ML model training is performed using containers. By way of non-limiting example, an instance of a Docker container can be provided by the ML training module 220 and can be used for training of the ML model. Docker is provided by Docker, Inc. of San Francisco, Calif. and can be described as a computer program that performs operating-system-level virtualization using containers, each container being isolated from other containers and bundling its own application, tools, libraries and configuration files. In some examples, the ML training module 220 creates an instance of a container, within which the ML model is trained. Upon completion of the training, the instance of the container is shutdown, and the trained ML model is stored.

In the example of FIG. 2, the ARDS 204 includes a training and resource monitoring module 224, a regression testing and detection module 226, a notification module 228, a user interface module 230, and a results repository 232. In some implementations, the training and resource monitoring module 224 allocates resources and monitors all training jobs executed by the ML server 202. In some examples, the training and resource monitoring module 224 extracts trained ML models for automated regression detection, as described herein.

For example, the training and resource monitoring module 224 can receive a training status message for a particular ML model that is being trained by the ML server 202. In some examples, the training status message indicates one of a set of statuses of the training. Example statuses include, without limitation, pending (e.g., indicating that the training job has been scheduled, but has not started), ongoing (e.g., indicating that the ML model is being trained), completed (e.g., indicating that the ML model has been trained), and error (e.g., indicating that an error occurred in the training job). In some examples, the training status message is periodically transmitted to the ARDS 204 by the ML server 202. In some examples, the training status is transmitted to the ARDS 204 in response to a change in status. In some examples, the ARDS 204 periodically polls the ML server 202 for the training status, and the training status message is sent by the ML server 202 to the ARDS 204 in response to a polling request.

In some implementations, the training and resource monitoring module 224 periodically checks the status of the container, within which the training is performed. For example, and as described above, an instance of a container (e.g., a Docker container) can be created, within which the ML model is trained. Upon completion of the training, the instance of the container is shutdown. In some examples, the training and resource monitoring module 224 can determine that the status of the container indicates that the container is shutdown. In response, the training and resource monitoring module 224 can determine that the training is complete, and can retrieve the trained ML model for regression testing.

In some implementations, the regression testing and detection module 226 implements artificial intelligence (AI) to conduct regression testing on newly trained ML models, detect instances of regression, if any, and generate regression test reports. More particularly, the regression testing and detection module 226 implements a Gaussian process (GP) to identify instances of high variance for both a negative side and a positive side. In some examples, high variance on the negative side indicates regression in performance of the ML model, and high variance on the positive side indicates improvement in performance of the ML model. In some examples, the GP defines a distribution over functions where inference occurs in a so-called function-space view. More particularly, the GP includes a mean function and a covariance function. The ML model is tested using test data (e.g., sets of electronic documents, for which matches are known), and variance is determined by the GP to evaluate regression, or improvement.

In general, the GP defines a distribution over functions, each function being mapped to an input space. A multi-dimensional vector of function values is provided and is evaluated at multiple points. The distribution over functions is a GP, if, for any finite subset of values, the marginal distribution over that finite subset has a multivariate Gaussian distribution.

In implementing the GP in accordance with implementations of the present disclosure, for each version of the ML model, a multidimensional GP graph is generated. After each training, benchmark data is added into the GP. Because training frequently occurs, the GP graph is well populated. In some examples, a function $f$ is defined and includes error bars (e.g., positive, negative) associated therewith and provided from past data. In some examples, a non-linear regression equation is provided as:

$$Y=f(X,\beta)+\varepsilon$$

where:
  X is a vector of p predictors (e.g., past benchmark data),
  $\beta$ is a vector of k parameters (e.g., new benchmark data),
  $f$ is a regression function, and
  $\varepsilon$ is an error term.

In some examples, the error term provides the error bars that enclose the nonlinear equation, and past benchmark data and new benchmark data are expected to fall between the error bars. If the new benchmark data of the newly trained ML model falls outside of the error bars, an anomaly is indicated. In response, a variance of the anomaly is determined. If the variance is a high positive variance, newly trained ML model has an improvement in a particular dimension (e.g., an attribute such as PR). If the variance is a high negative variance, there is a regression.

In some implementations, the notification module 228 notifies stakeholders of the completion of the training job, the training time, regression test results and provides regression test reports generated from the regression testing and detection module 226. In some implementations, an enterprise can leverage a communication platform to provide communication through one or more channels. In some examples, the ARDS 204 connects to the communication platform through the notification module 228 to provide notifications to stakeholders, for example. An example communication platform includes, without limitation, Slack provided by Slack Technologies of San Francisco, Calif. In some examples, the communication platform enables users (e.g., employees of the enterprise) and/or software systems, such as the ARDS 204, to communicate with one another. In some implementations, the notification module 228 of the ARDS 204 transmits notifications to stakeholders through the communication platform.

In some implementations, the user interface module 230 provides a user interface (UI) for the stakeholders to view an overview summary of the regression testing. In some examples, the UI depicts instances of regression and/or improvements in a ML model relative to a previous version of the ML model. In some implementations, and as described in further detail herein, the UI depicts multiple attributes for respective versions of ML models. In some examples, the UI provides visual attributes for respective values of attributes to indicate regression or improvement.

FIG. 3 depicts an example UI 300 provided by the user interface module 230 of FIG. 2. In the example of FIG. 3, the example UI 300 depicts example regression test results for an enterprise application (e.g., release-v7.7 of the enterprise application) that leverages the trained ML model. For example, the example regression test results compare a base version of the enterprise application to a latest version of the enterprise application. In some examples, and in the example context, the base version includes a trained ML model that matches bank statements to invoices, and the latest version includes a retrained ML model that matches bank statements to invoices. For example, changes to the base version can result in retraining of the ML model to provide the retrained ML model of the latest version.

In some implementations, and as depicted in FIG. 3, sets of attributes 302 are provided for each of the base version and the latest version. In some examples, each set of attributes corresponds to a respective key. In the example context, example keys include, without limitation, countries (e.g., Singapore (SG), Malaysia (MY), Australia (AU), United States (US), New Zealand (NZ), and all (ALL). Example attributes include proposal rate (PR), accuracy (Acc), and auto rate (AR). In the example context, the attributes can be determined for single matches (S) (e.g., a sub-set of attributes 302a) and/or single and multiple matches (S+M) (e.g., a sub-set of attributes 302b).

In the example context, the PR is determined based on the number of bank statements, for which a proposal (e.g., a match to invoice(s)) is provided, divided by the total number of bank statements. In the example context, the Acc is determined based on the number of correctly proposed bank statements (e.g., correct match to invoice(s)) divided by the number of bank statements, for which a proposal (e.g., a match to invoice(s)) is provided. In the example context, the AR is determined based on the number of correctly proposed banks statements (e.g., correct match to invoice(s)) divided by the total number of bank statements.

In some implementations, the UI 300 can include visual attributes to indicate improvement or regression. In some examples, visual attributes can indicate a severity of regression. In the example of FIG. 3, the UI 300 includes shading to indicate improvement (e.g., light shading in the sub-set 302b) or severity of regression (e.g., darker shadings in the sub-set 302b). It is contemplated, however, that any appropriate visual attributes can be used. In some examples, an improvement is indicated, if a value of an attribute of the retrained ML model is greater than a corresponding value of the attribute of the ML model.

For example, in the example of FIG. 3, the values of the attributes PR(S+M) and AR(S+M) of the key SG for the retrained ML model are each greater than the corresponding values of the attributes for the ML model. Consequently, each is depicted with light shading indicating an improvement of the retrained ML model over the ML model. As another example, the value of the attribute Acc(S+M) of the key SG for the retrained ML model is less than the corresponding value of the attribute for the ML model. Consequently, dark shading is provided to indicate a regression of the retrained ML model over the ML model.

In some implementations, a severity of regression can be determined based on comparing a difference between a value of an attribute of the retrained ML model and a value of the attribute of the ML model to one or more threshold values. For example, the difference can be compared to a difference threshold and, if the difference does not exceed the difference threshold, the regression can be determined to be a first severity, and if the difference exceeds the difference threshold, the regression can be determined to be a second severity that is greater than the first severity.

Figure 4:
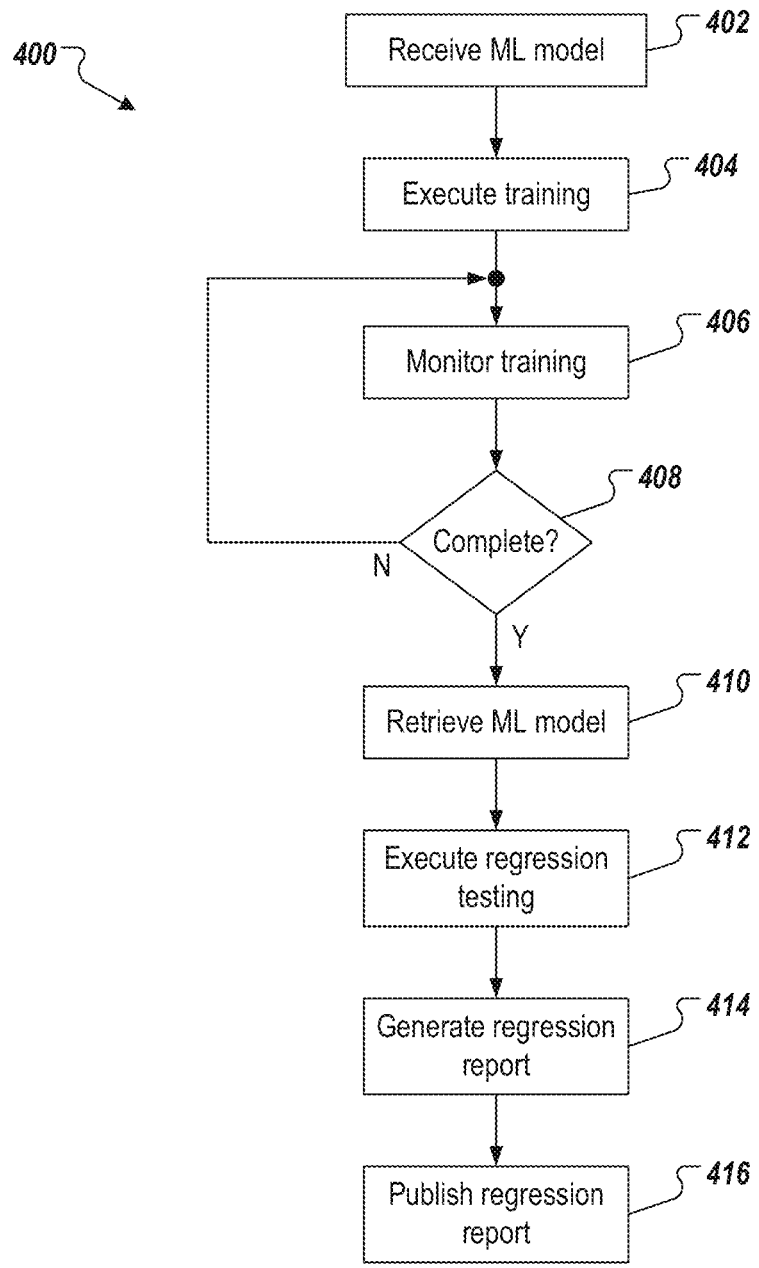
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

An ML model is received (402). For example, and with reference to FIG. 2, the ML training module 220 of the ML server 202 receives an untrained ML model from the model repository 222. In some examples, a previously trained ML model is provided as a first version (e.g., Base) and the untrained ML model is provided as a second version (e.g., Latest). That is, for example, the untrained ML model incorporates one or more changes made to the previously trained ML model. Training of the ML model is executed (404). For example, the ML training module 220 creates an instance of a container, within which the untrained ML model (e.g., Latest) is trained (e.g., supervised training, unsupervised training, semi-supervised training). The ML training module 220 executed training of the ML model within the ML server 202.

Training of the ML model is monitored (406). For example, the training and resource monitoring module 224 of the ARDS 204 monitors training of the ML model. In some examples, monitoring of the training of the ML model includes periodically determining a status of the container, within which the ML model is trained. It is determined whether training of the ML model is complete (408). For example, the training and resource monitoring module 224 determines whether the container is active (e.g., indicating that training is ongoing) or is shutdown (e.g., indicating that training is complete). If training of the ML model is not complete, the example process 400 loops back.

If training of the ML model is complete, the ML model is retrieved (410). More particularly, the ML model is automatically retrieved by the ARDS 204 without human intervention requesting retrieval. For example, the regression testing and detection module 226 of the ARDS 204 automatically retrieves the (trained) ML model (e.g., Latest) from the ML server 202 in response to completion of the training of the ML model. In some examples, the regression testing and detection module 226 requests the ML model from the ML server 202, which provides the ML model in response to the request.

Regression testing is executed (412). For example, the regression testing and detection module 226 executes regression testing by processing the ML model based on test data. In some examples, and as described in further detail herein, the regression testing and detection module 226 executes a Gaussian process (GP) to identify instances of high variance for both a negative side and a positive side. A regression report is generated (414) and the regression report is published (416). For example, and as described herein with reference to FIG. 3, the UI module 230 of the ARDS 204 generates a UI (e.g., the UI 300 of FIG. 3) that provides a visual depiction of the results of the regression testing. In some examples, the notification module 228 transmits notifications to one or more stakeholders through a communication platform. In some examples, each notification provides a link that can be selected to have the UI displayed.

Figure 5:
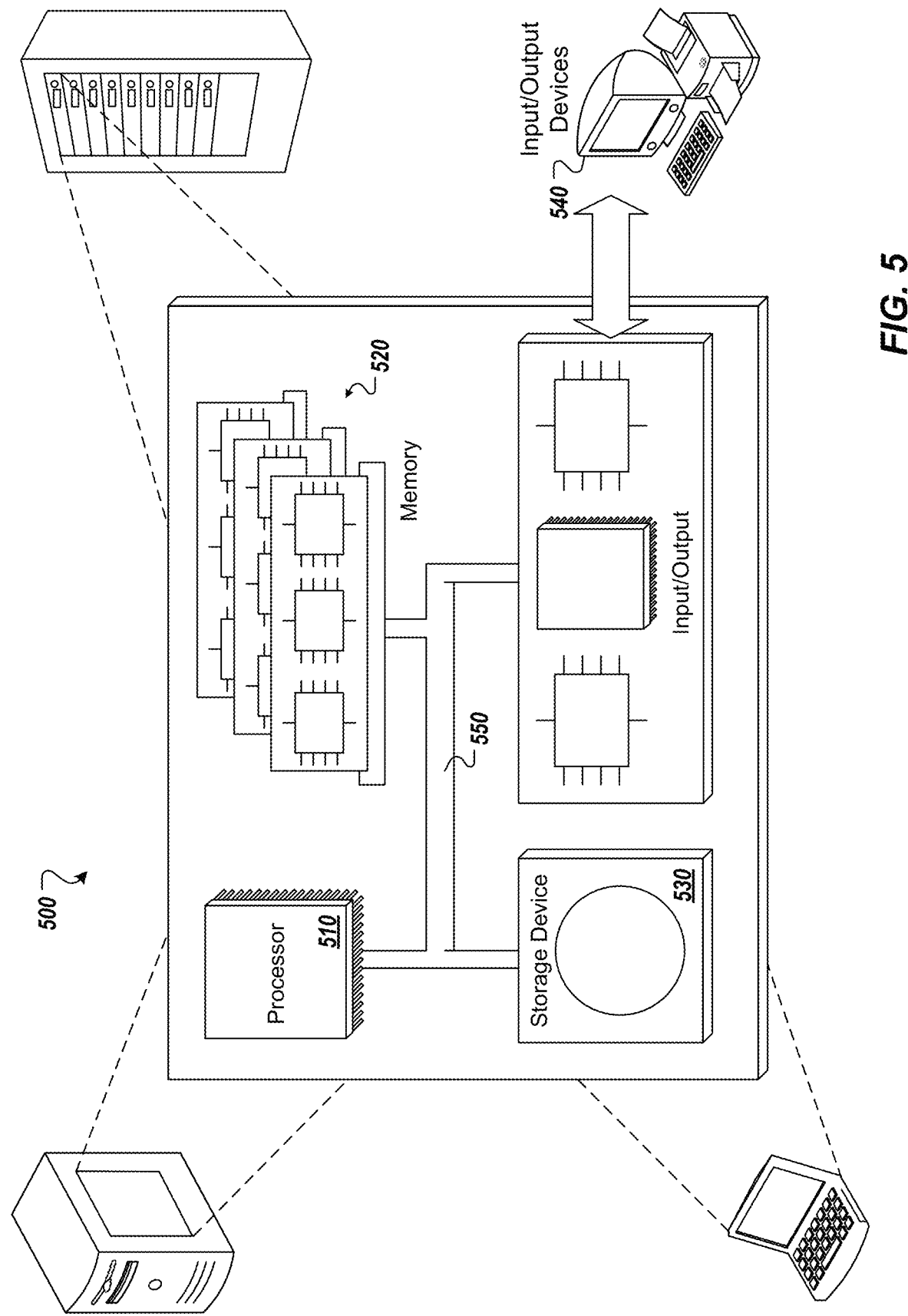
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for automatic regression detection in machine learning (ML) models, the method being executed by one or more processors and comprising:
    determining, by an automated regression detection system (ARDS), that training of a ML model is complete, by:
        periodically checking, by a training and resource monitoring module of the ARDS, a status of the container, within which the training of the ML model is performed, the ML model comprising a version of a previously trained ML model and being customized for countries in a set of countries based on region-specific training data, the training and resource monitoring module being configured to allocate resources and monitor all training jobs executed by a ML server including the training of the ML model, and
        determining that the status of the container indicates that the container is shutdown indicating that the training of the ML model is complete; and
    in response to determining that training of the ML model is complete, automatically, by the ARDS:
        retrieving the ML model,
        executing regression testing and detection using the ML model,
        generating regression results relative to the previously trained ML model, the regression results comprising a first set of results representative of performance of the previously trained ML model and a second set of results representative of performance of the ML model, each of the first set of results and the second set of results including a set of keys, each key indicating a row corresponding to a respective country in the set of countries, and, for each key in the set of keys, a value for each attribute in a set of attributes is provided, the set of attributes comprising proposal rate, accuracy, and auto rate for each class of a set of classes predicted by the previously trained ML model and the ML model, and
        publishing the regression results.

2. The method of claim 1, wherein executing regression testing and detection using the ML model comprises determining variance in performance of the ML model using a Gaussian process (GP).

3. The method of claim 2, wherein the variance comprises one or more of a negative-side variance indicating regression of the ML model relative to the previously trained ML model, and a positive-side variance indicating improvement of the ML model relative to the previously trained model.

4. The method of claim 1, wherein the container is provisioned in a ML server to train the ML model.

5. The method of claim 1, wherein publishing the regression results comprises transmitting one or more notifications to respective stakeholders through a communication platform.

6. The method of claim 1, wherein publishing the regression results comprises providing a user interface (UI) for display, the UI graphically depicting regression results as between the ML model and the previously trained ML model.

7. The method of claim 6, wherein the regression results are based on a set of attributes that each represent a respective performance of the ML model relative to the previously trained ML model.

8. A non-transitory computer-readable storage medium coupled to one or more processors and having instructions stored thereon which, when executed by the one or more processors, cause the one or more processors to perform operations for automatic regression detection in machine learning (ML) models, the operations comprising:
    determining, by an automated regression detection system (ARDS), that training of a ML model is complete, by:
        periodically checking, by a training and resource monitoring module of the ARDS, a status of the container, within which the training of the ML model is performed, the ML model comprising a version of a previously trained ML model and being customized for countries in a set of countries based on region-specific training data, the training and resource monitoring module being configured to allocate resources and monitor all training jobs executed by a ML server including the training of the ML model, and
        determining that the status of the container indicates that the container is shutdown indicating that the training of the ML model is complete; and
    in response to determining that training of the ML model is complete, automatically, by the ARDS:
        retrieving the ML model,
        executing regression testing and detection using the ML model,
        generating regression results relative to the previously trained ML model, the regression results comprising a first set of results representative of performance of the previously trained ML model and a second set of results representative of performance of the ML model, each of the first set of results and the second set of results including a set of keys, each key indicating a row corresponding to a respective country in the set of countries, and, for each key in the set of keys, a value for each attribute in a set of attributes is provided, the set of attributes comprising proposal rate, accuracy, and auto rate for each class of a set of classes predicted by the previously trained ML model and the ML model, and
        publishing the regression results.

9. The computer-readable storage medium of claim 8, wherein executing regression testing and detection using the ML model comprises determining variance in performance of the ML model using a Gaussian process (GP).

10. The computer-readable storage medium of claim 9, wherein the variance comprises one or more of a negative-side variance indicating regression of the ML model relative to the previously trained ML model, and a positive-side variance indicating improvement of the ML model relative to the previously trained model.

11. The computer-readable storage medium of claim 8, wherein the container is provisioned in a ML server to train the ML model.

12. The computer-readable storage medium of claim 8, wherein publishing the regression results comprises transmitting one or more notifications to respective stakeholders through a communication platform.

13. The computer-readable storage medium of claim 8, wherein publishing the regression results comprises providing a user interface (UI) for display, the UI graphically depicting regression results as between the ML model and the previously trained ML model.

14. The computer-readable storage medium of claim 13, wherein the regression results are based on a set of attributes that each represent a respective performance of the ML model relative to the previously trained ML model.

15. A system, comprising:
a computing device; and
a computer-readable storage device coupled to the computing device and having instructions stored thereon which, when executed by the computing device, cause the computing device to perform operations for automatic regression detection in machine learning (ML) models, the operations comprising:
   determining, by an automated regression detection system (ARDS), that training of a ML model is complete, by:
      periodically checking, by a training and resource monitoring module of the ARDS, a status of the container, within which the training of the ML model is performed, the ML model comprising a version of a previously trained ML model and being customized for countries in a set of countries based on region-specific training data, the training and resource monitoring module being configured to allocate resources and monitor all training jobs executed by a ML server including the training of the ML model, and
      determining that the status of the container indicates that the container is shutdown indicating that the training of the ML model is complete; and
   in response to determining that training of the ML model is complete, automatically, by the ARDS:
      retrieving the ML model,
      executing regression testing and detection using the ML model,
      generating regression results relative to the previously trained ML model, the regression results comprising a first set of results representative of performance of the previously trained ML model and a second set of results representative of performance of the ML model, each of the first set of results and the second set of results including a set of keys, each key indicating a row corresponding to a respective country in the set of countries, and, for each key in the set of keys, a value for each attribute in a set of attributes is provided, the set of attributes comprising proposal rate, accuracy, and auto rate for each class of a set of classes predicted by the previously trained ML model and the ML model, and
      publishing the regression results.

16. The system of claim 15, wherein executing regression testing and detection using the ML model comprises determining variance in performance of the ML model using a Gaussian process (GP).

17. The system of claim 16, wherein the variance comprises one or more of a negative-side variance indicating regression of the ML model relative to the previously trained ML model, and a positive-side variance indicating improvement of the ML model relative to the previously trained model.

18. The system of claim 15, wherein the container is provisioned in a ML server to train the ML model.

19. The system of claim 15, wherein publishing the regression results comprises transmitting one or more notifications to respective stakeholders through a communication platform.

20. The system of claim 15, wherein publishing the regression results comprises providing a user interface (UI) for display, the UI graphically depicting regression results as between the ML model and the previously trained ML model.

* * * * *